United States Patent [19]

Wortmann et al.

[11] 4,166,743

[45] Sep. 4, 1979

[54] INTUMESCENT FLAME-RETARDANT COATING COMPOSITIONS

[75] Inventors: Joachim Wortmann, Türnich; Franz-Josef Dany; Joachim Kandler, both of Erftstadt, all of Fed. Rep. of Germany

[73] Assignee: Hoechst Aktiengesellschaft, Hurth-Knapsack, Fed. Rep. of Germany

[21] Appl. No.: 873,974

[22] Filed: Jan. 31, 1978

[30] Foreign Application Priority Data

Feb. 5, 1977 [DE] Fed. Rep. of Germany ....... 2704897

[51] Int. Cl.$^2$ ................................................ C09K 3/28
[52] U.S. Cl. ................................. 252/8.1; 106/18.14; 106/18.31; 260/DIG. 24; 428/921
[58] Field of Search ........... 106/15 FP, 288 B, 308 B; 428/920, 921; 252/8.1; 162/159; 260/2.5 FP, DIG. 24

[56] References Cited

U.S. PATENT DOCUMENTS

| | | | |
|---|---|---|---|
| 1,924,181 | 6/1928 | Cutler | 162/159 |
| 2,030,653 | 12/1931 | Quinn | 162/159 |
| 3,513,114 | 5/1970 | Hahn et al. | 106/15 |
| 3,562,197 | 2/1971 | Sears et al. | 106/15 |
| 3,654,190 | 4/1972 | Levine | 252/8.1 |

*Primary Examiner*—Lorenzo B. Hayes
*Assistant Examiner*—W. J. Thompson
*Attorney, Agent, or Firm*—Connolly and Hutz

[57] ABSTRACT

Intumescent flame-retardant coating composition consisting substantially of a film-forming agent, an ammonium polyphosphate, one or more substances which are carbonizable under the action of heat, a dispersant, and optionally a filler. The coating composition additionally contains an ammonium polyphosphate activator weighing 0.5 to 50% of the weight of ammonium polyphosphate. The activator is constituted by at least one salt which contains water of crystallization which is liberated upon the composition being heated to about 35° C.

7 Claims, No Drawings

INTUMESCENT FLAME-RETARDANT COATING COMPOSITIONS

This invention relates to intumescent flame-retardant coating compositions.

It is known that ammonium polyphosphate (referred to below as APP simply) can be used for flameproofing combustible synthetic resins and wood, for instance. To this end, use is commonly made of a water-insoluble APP with a view to ensuring that the APP will not be dissolved out from the material which is to be protected, and with a view to producing in this way a reliable permanent flame-retardant effect. Water-insoluble APP can be represented by the simplified formula $(NH_4PO_3)_n$, in which n is 20 to 1000, preferably 200 to 800, and it can be made, for example, by the process described in German Patent Specification ("Offenlegungsschrift") No. 2,330,174.

Among the specific uses of APP may be mentioned its uses in compositions capable of forming a heat-insulating layer and in intumescent paints which expand and decompose to give a small-pored cellular layer of carbon under the action of heat, e.g. in contact with a naked flame. This is a cellular layer which inhibits the rapid transfer of heat to articles which are to be protected, e.g. joists and other supporting means for floors or roofs, which may be of steel or wood. In the above-mentioned insulating layer forming compositions, the APP assists the formation of carbon from carbonisable substances, e.g. pentaerythritol or starch, and the evolution of incombustible expanding gas from decomposable substances, e.g. dicyandiamide, melamine or chlorine-substituted paraffins. More specifically, under the action of heat, the APP undergoes decomposition into ammonia and phosphoric acid, the latter being the substance which actually has the desired effect upon the carbonizable and gas-evolving materials.

Intumescent flame-retardant coating compositions consisting of an APP, one or more substances which are carbonizable under the action of heat, a dispersant and optionally one or more fillers, have already been disclosed in German Patent Specification ("Offenlegungsschrift") No. 2,359,699. This indicates that the sooner phosphoric acid is formed by the decomposition, under the action of heat, of the APP in the coating composition, the sooner the desired insulating layer begins to form, and the less serious is the undesirable heating of the article which is to be protected.

We have now found that, by the use of an intumescent flame-retardant coating composition which additionally contains at least one salt containing water of crystallization, it is possible to activate the APP, i.e. to potentiate the accelerated decomposition of the APP.

In combustibility tests, under standard conditions, of a coating composition containing the above-mentioned salt(s), the desired cellular layer began to form more rapidly, and was thicker, than in the case of the prior-art coating compositions of which we are aware.

According to the present invention, therefore, we provide an intumescent flame-retardant coating composition comprising a film-forming agent, an APP, one or more substances which are carbonizable under the action of heat, a dispersant, and optionally one or more fillers, which coating composition additionally contains an ammonium polyphosphate activator, preferably weighing 0.5 to 50% of the weight of the APP, this activator being constituted by at least one salt which contains water of crystallization which is liberated upon the composition being heated, e.g. to at least 35° C.

The salts containing water of crystallization which can be used as activators in accordance with this invention comprise both salts which are soluble in water and salts which are difficultly soluble or insoluble in water. The weight of the activator comprising at least one of these salts is more preferably 2 to 20% of the weight of the ammonium polyphosphate.

More specifically, a composition according to the present invention may for example employ an activator comprising at least one of the following salts: (a) (water-soluble salts) $NaAl(SO_4)_2.12H_2O$; $Na_2B_4O_7.10H_2O$; $Al_2(SO_4)_3.18H_2O$; $NH_4Fe(SO_4)_2.12H_2O$; and (b) (difficultly water-soluble or water-insoluble salts) $CaSO_4.2H_2O$; $CaHPO_4.2H_2O$; $MgHPO_4.3H_2O$.

A still further preferred feature provides for the activator to comprise at least one salt which contains water of crystallization which is liberated upon the composition being heated to a temperature of 35° to 250° C. It has been found that the first three of the water-soluble salts specified at "(a)" above liberate their water of crystallization at temperatures lower than 200° C., the $NH_4Fe(SO_4)_2.12H_2O$ salt liberating its water of crystallization at 230° C.

A typical coating composition according to this invention has a composition by weight substantially as follows:

4 to 25% of film-forming agent;
10 to 40% of APP;
8 to 40% of one or more substances carbonizable under the action of heat;
up to 5% of dispersant;
0.1 to 20% of salt containing water of crystallization;
0 to 25% of filler;
0 to 25%, e.g. 6 to 25%, of expanding agent.

The following statements are intended further to illustrate what ingredients may be employed in the coating composition of the present invention.

The APP used in the present coating composition can have the following general formula:

in which n is a whole number averaging 400 to 800, preferably 500 to 800, and the ratio of m to n is of the order of 1:1.

The coating composition preferably contains 5 to 25% of APP by weight, calculated on the total composition.

The film-forming agent may comprise, for instance, an aqueous synthetic resin dispersion, e.g. an aqueous dispersion of polyvinyl acetate or an aqueous dispersion of a copolymer derived from vinyl acetate and dibutyl maleate; or a solution of a resin in an organic solvent, e.g. a solution of a ureaformaldehyde resin in a solvent comprising a mixture of butanol and xylene.

Examples of the heat-carbonizable substances which are useful in the coating compositions of the present invention are dicyandiamide, pentaerythritol and melamine.

Insofar as the coating composition is desired to be of a brushable consistency, it is good practice to disperse the solid ingredients in water, ethyl acetate, butyl acetate, xylene or toluene, for example.

As stated above, the coating composition may also contain one or more fillers. According to the effect which the one or more fillers are desired to produce, they may for example comprise one or more of the following: titanium dioxide; wollastonite; kaolin; magnesium, potassium or aluminium silicate; basic zeolite; carboxymethyl cellulose; flame-retardant agents; pigments.

The APP ingredient of the present coating composition can for example be made by a process as described in the above-mentioned German Patent Specification ("Offenlegungsschrift") No. 2,330,174, wherein approximately equimolar proportions of ammonium orthophosphate and phosphorus pentoxide are heated to 170° to 350° C. in the presence of gaseous ammonia, the material which is to undergo reaction being continuously mixed, kneaded and comminuted.

The coating composition can also be made by the simple mechanical mixing of the individual components in the usual manner.

The coating composition of the present invention compares favorably, in respect of the rate of decomposition of the APP, with the prior-art compositions which contain no ammonium polyphosphate activator but which are of similar composition otherwise. The APP does in fact decompose more rapidly into $NH_3$ and phosphoric acid in the presence of the activator used in accordance with this invention, and the flame-retardant effect which is produced on applying the coating composition to a combustible material is improved accordingly.

The following Examples illustrate the present coating compositions and their efficiency. The individual intumescent paints described in these Examples were tested for their insulating power by DIN-method (DIN stands for German Industrial Standard) 4102, part 2 (1970), in a combustibility testing oven operated as described in DIN 18022, sheet 2.

EXAMPLE 1

The following materials were ground for 1 hour in a ball mill and at the same time intimately mixed together:
 50.4 g of pentaerythritol,
 53.6 g of melamine,
 171.6 g of APP of the formula $(NH_4PO_3)_n$, in which n is 700,
 53.4 g of solid chlorine-substituted paraffins containing 70 weight % of chlorine,
 39.2 g of $TiO_2$, and
 1.6 g of $NaAl(SO_4)_2.12H_2O$ as an activator.

Next, the whole was admixed with agitation with 80 g of an oily alkyd resin (60%) sold as Alftalat AM 330 (Alftalat being a registered Trade Mark of Hoechst A. G., Frankfurt), and 100 g of xylene, and the resulting mass was applied by means of a brush on to one side of a testpiece with the dimensions of 50×50×0.5 cm. The testpiece was allowed to dry for 1 day at room temperature, and then treated a second time. Altogether a total of 2 kg of coating composition per m² was applied. The sheet so coated was dried for 3 weeks at 22° C. in a tream of air, and then subjected to the burn-off test described in DIN 4102. The test results are indicated in the Table hereinafter.

EXAMPLES 2 to 5

The procedure was as described in Example 1, except that the following were used as the activator:
 Example 2: 5 g of $Na_2B_4O_7.10H_2O$;
 Example 3: 10 g of $NH_4Fe(SO_4)_2.12H_2O$;
 Example 4: 20 g of $CaSO_4.2H_2O$;
 Example 5: 86 g of $MgHPO_4.3H_2O$.

The results obtained in the burn-off test are shown in the Table hereinafter.

EXAMPLE 6

(Comparative example)

The procedure was as in Example 1, except that no activator was added. The results obtained in the burn-off test are shown in the Table hereinafer.

EXAMPLE 7

The following materials were ground for 3 hours in a ball mill and thereby intimately mixed together:
 110 g of APP of the formula $(NH_4PO_3)_n$, in which n is 400,
 80 g of dicyandiamide,
 60 g of dipentaerythritol,
 15 g of starch,
 20 g of titanium dioxide,
 125 g of water, and
 11 g of $CaHPO_4.2H_2O$ as the activator.

Next, the whole was admixed with 90 g of a 60 weight % aqueous dispersion of a mixture of 80 weight % of polyvinyl acetate and 20 weight % of tris-($\beta$-chloroethyl)phosphate, and the resulting mixture was applied by means of a brush on to a testpiece in the form of a sheet, in a total quantity of 2 kg/m². The sheet so coated was allowed to dry over a period of 3 weeks at 22° C., and then subjected to the burn-off test described in DIN 4102. The test results obtained are indicated in the Table hereinafter.

EXAMPLE 8

(Comparative example)

The procedure was as in Example 7, except that no activator was added. The results obtained in the burn-off test are indicated in the Table hereinafter.

EXAMPLE 9

The following materials were ground and intimately mixed together in a ball mill:
 33.7 g of dicyandiamide,
 31.5 g of pentaerythritol,
 24.6 g of $TiO_2$,
 109.3 g of an APP of the formula $(NH_4PO_3)_n$, in which n is 300,
 33.6 g of solid chlorine-substituted paraffin containing 70 wt.% of chlorine, and
 5.5 g of $Al_2(SO_4)_3.18H_2O$ as the activator.

The dry blend was admixed with 27.5 g of ethyl cellulose and 30 g of glass fibres 3 mm long, and the whole was made into a paste with 240 g of toluene. The paste was applied in a total quantity of 2 kg/m² on to a testpiece in the form of a sheet, and the sheet was allowed to dry over a period of 3 weeks in a stream of air. The results obtained in the burn-off test are indicated in the Table hereinafter.

EXAMPLE 10

(Comparative Example)

The procedure was as in Example 9, except that no activator was added. The test results obtained in the burn-off-test are described in the following Table.

| A | B | C | D | E | F |
|---|---|---|---|---|---|
| 1 | $NaAl(So_4)_2.12H_2O$ | | 0.9 | 3.1 | 240 | 4.2 |
| 2 | $Na_2B_4O_7.10H_2O$ | | 2.9 | 2.8 | 233 | 4.7 |

-continued

| A | B | C | D | E | F |
|---|---|---|---|---|---|
| 3 | NH$_4$Fe(SO$_4$)$_2$ . 12H$_2$O | 5.8 | 2.9 | 226 | 5.5 |
| 4 | CaSO$_4$ . 2H$_2$O | 11.7 | 2.2 | 228 | 5.2 |
| 5 | MgHPO$_4$ . 3H$_2$O | 50.0 | 1.5 | 185 | 5.6 |
| 6 | — | — | 3.5 | 245 | 3.5 |
| 7 | CaHPO$_4$ . 2H$_2$O | 10.0 | 1.7 | 307 | 2.2 |
| 8 | — | — | 2.2 | 359 | 1.3 |
| 9 | Al$_2$(SO$_4$)$_3$ . 18H$_2$O | 5.0 | 2.1 | 284 | 1.4 |
| 10 | — | — | 3.1 | 301 | 0.9 |

In the above Table, the column reference letters have the following meanings:

A = Example No.
B = Activator
C = Proportion of activator in weight %, based on weight of APP
D = Time until coating composition begins to expand in flame test (minutes)
E = Temperature on uncoated side (opposite flame) of testpiece (average for 5 test points) in ° C.
F = Thickness in cm of expanded layer after 30-minute flame test.

A comparison of Examples 1 to 5 with Example 6, or of Example 7 with Example 8, or of Example 9 with Example 10, shows the valuable effects obtainable by the use of the present activators. More specifically, the compositions of Examples 1 to 5 compare favorably with the coating composition described in comparative Example 6 in that the expanded layer begins to form more rapidly and is thicker, and the testpiece is exposed to lower temperatures. The results obtained in Examples 7 and 9 also compare favorably with those obtained in comparative Examples 8 and 10, respectively.

We claim:

1. In an intumescent flame-retardant coating composition comprising a film-forming agent, an ammonium polyphosphate, at least one substance carbonizable under the action of heat, and a liquid dispersant; the improvement consisting of an activator for the ammonium polyphosphate consisting essentially of at least one salt which contains water of crystallization that is liberated when the composition is heated to about 35° C. in an amount of 0.5 to 50% by weight of the ammonium polyphosphate.

2. A composition as claimed in claim 1, wherein the said activator is at least one salt containing water of crystallization which is soluble, difficultly soluble or insoluble in water.

3. A composition as claimed in claim 2, wherein the water-soluble salt is selected from Na Al(SO$_4$)$_2$.12H$_2$O; Na$_2$B$_4$O$_7$.10H$_2$O; Al$_2$(SO$_4$)$_3$.18H$_2$O or NH$_4$Fe(SO$_4$)$_2$.12H$_2$O.

4. A composition as claimed in claim 2, wherein the difficultly water soluble or water insoluble salt is selected from CaSO$_4$.2H$_2$O; CaHPO$_4$.2H$_2$O or MgHPO$_4$.3H$_2$O.

5. A composition as claimed in claim 1, wherein the salt contains water of crystallization which is liberated upon the composition being heated to a temperature of 35° to 250° C.

6. A composition as claimed in claim 1, wherein the weight of the said activator is 2 to 20% of the weight of the ammonium polyphosphate.

7. A composition as claimed in claim 1 of which the composition by weight is substantially as follows:

4 to 25% of film-forming agent;
10 to 40% of ammonium polyphosphate;
8 to 40% of at least one substance carbonizable under the action of heat;
up to 5% of dispersant;
0.1 to 20% of at least one salt containing water of crystallization;
0 to 25% of filler;
0 to 25% of expanding agent.

* * * * *

UNITED STATES PATENT AND TRADEMARK OFFICE
CERTIFICATE OF CORRECTION

PATENT NO. : 4,166,743

DATED : September 4, 1979

INVENTOR(S) : Wortmann et al

It is certified that error appears in the above-identified patent and that said Letters Patent are hereby corrected as shown below:

COVER PAGE, left-hand column, item "[73]" change "Hurth-Knapsack to --Frankfurt/Main--.

Signed and Sealed this

Twenty-ninth Day of April 1980

[SEAL]

Attest:

SIDNEY A. DIAMOND

Attesting Officer

Commissioner of Patents and Trademarks